(12) United States Patent
Streid et al.

(10) Patent No.: US 7,334,902 B2
(45) Date of Patent: *Feb. 26, 2008

(54) WIDE ANGLE SCANNER FOR PANORAMIC DISPLAY

(75) Inventors: Harry Streid, Salt Lake City, UT (US); Robert R. Christensen, Salt Lake City, UT (US); Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/092,128

(22) Filed: Mar. 28, 2005

(65) Prior Publication Data

US 2008/0002161 A1    Jan. 3, 2008

Related U.S. Application Data

(63) Continuation-in-part of application No. 10/642,880, filed on Aug. 18, 2003, now Pat. No. 6,871,958.

(51) Int. Cl.
G03B 21/28 (2006.01)
G03B 21/56 (2006.01)

(52) U.S. Cl. .................................. 353/98; 359/451

(58) Field of Classification Search ............ 353/30, 353/31, 37, 94, 98, 99, 50, 79; 434/44; 348/36, 348/37; 359/451
See application file for complete search history.

(56) References Cited

U.S. PATENT DOCUMENTS

| | | |
|---|---|---|
| 3,201,797 A | 8/1965 | Roth |
| 3,370,505 A | 2/1968 | Bryan |
| 3,734,602 A | 5/1973 | Vevick |
| 3,785,715 A | 1/1974 | Mechlenborg |
| 4,100,571 A | 7/1978 | Dykes et al. |
| 4,170,400 A | 10/1979 | Bach et al. |
| 4,390,253 A | 6/1983 | Lobb |
| 4,427,274 A | 1/1984 | Pund et al. |
| 5,023,725 A | 6/1991 | McCutchen |
| 5,300,942 A | 4/1994 | Dolgoff |
| 5,500,747 A | 3/1996 | Tanide et al. |
| 5,566,370 A | 10/1996 | Young |
| 5,818,998 A | 10/1998 | Harris et al. |
| 6,042,238 A | 3/2000 | Blackham et al. |
| 6,219,015 B1 | 4/2001 | Bloom et al. |
| 6,375,366 B1 | 4/2002 | Kato et al. |
| 6,480,634 B1 | 11/2002 | Corrigan |
| 6,511,182 B1 | 1/2003 | Agostinelli et al. |
| 6,871,958 B2 * | 3/2005 | Streid et al. ................. 353/37 |
| 7,111,943 B2 * | 9/2006 | Agostinelli et al. .......... 353/79 |
| 2002/0067467 A1 | 6/2002 | Dorval et al. |
| 2002/0146248 A1 | 10/2002 | Herman et al. |

FOREIGN PATENT DOCUMENTS

WO    WO 02/12925 A2    2/2002

* cited by examiner

*Primary Examiner*—W. B. Perkey
(74) *Attorney, Agent, or Firm*—Thorpe North & Western LLP

(57) ABSTRACT

A wide angle display system includes a linear array projector, a curved display surface, and an n-sides scanning mirror. The projector is configured to project an image along an optical axis to the scanning mirror. The scanning mirror continuously rotates about a rotational axis at a speed 1/n the refresh rate, so as to reflect and scan the image onto the display surface.

12 Claims, 9 Drawing Sheets

WIDE ANGLE SCANNER FOR PANORAMIC DISPLAY

RELATED APPLICATIONS

This application is a continuation-in-part application, which claims priority to U.S. patent application Ser. No. 10/642,880, filed Aug. 18, 2003, now U.S. Pat. No. 6,871,958, and entitled, "Wide Angle Scanner for Panoramic Display," which is incorporated by reference in its entirety herein.

FIELD OF THE INVENTION

The present invention relates generally to panoramic visual display systems. More particularly, the present invention relates to a system for providing a very wide angle display using a single projector.

BACKGROUND OF THE INVENTION AND RELATED ART

A panoramic display is generally considered one in which the horizontal dimension is much greater than the vertical dimension, such that the display horizontally wraps around the viewing point, at least partially. Panoramic visual display systems are desirable in a number of applications. One particular application needing wide fields of view is flight simulation and training. Heretofore, panoramic flight simulator visual display systems have typically used multiple projectors, with their separate images edge-blended in a mosaic to create an apparently continuous wide field of view. Anywhere from three to ten or more individual projectors are commonly used, and multiple projector displays with 64 or more separate projectors have been proposed to meet the need for high resolution imagery over a very wide field of view.

Two types of such displays have frequently been used in simulation and training. The first type, shown in FIG. 13, comprises a panoramic real image display system 100, wherein a projected real image 102 is viewed by an observer from a viewing point 106 near the center of a curved front projection screen 108, in this case a dome. In such a system, multiple projectors 110 are typically located above and/or behind the viewer, preferably outside of view. For very large fields of view, a nearly complete dome display screen is used, as shown. However, it becomes increasingly difficult with increasing field of view to place projectors in locations that provide uniform illumination and resolution, yet are still hidden from view. In addition, current methods for blending the edges of images from adjacent projectors are not completely effective at hiding the seams between images, and color matching of adjacent images from multiple projectors is very difficult. The common result is composite images with noticeable seams and inconsistent coloring from one portion of the image to another.

Another frequently used display type is a wide angle virtual display 112, shown in FIGS. 14 and 15. This type of display is frequently used for civil aviation simulators. In this type of display, an observer views a concave mirror 114 which provides a reflection of an image that has been projected onto a back-projection screen 116. The object for the collimating mirror is a real image projected by multiple projectors 118. In this system both the projectors and the eyepoint 120 (inside the simulator cockpit 122) are offset from the center of curvature 126 of the screen, and the center of curvature 124 of the mirror.

The geometry shown in FIGS. 14 and 15 creates problems for projectors in general and for panoramic displays with multiple projectors in particular. As illustrated in FIG. 15, there is a single point 130 in space that is preferred by an optical projection system for directing the greatest amount of light toward the viewing location 120. Ideally, all of the light would be projected downward and around from this point to all areas of the projection screen 116. However, it is impossible to locate multiple projectors at a single point in space. Additionally, the low f-number lenses required for CRT projectors normally used do not have sufficient depth of focus to allow positioning at the preferred location 130. Also, large projectors in these positions are problematic for training applications that use motion bases. The large mass of multiple projectors placed high above the screen creates an unacceptably large moment of inertia for simulators or other applications incorporating motion systems. For these reasons, current wide-angle virtual systems, such as that shown in FIG. 14, have projectors located in a compromised position below and behind the ideal location.

A laser projector can have sufficient depth of focus to project from the ideal point well above the screen, but it must be scanned with a significant downward tilt relative to the vertical axis of the screen. The type of scanner that has been used with laser projectors in the past is not capable of the wide angle, tilted scan required for both a wide angle virtual display and a panoramic real image display.

Panoramic scanners have been developed for linear detector arrays. In prior systems, wide angle scanning of a linear (or two dimensional) array of sensors or light modulators is usually done with a mirror or prism at a 45 degree angle to an axis of rotation that is perpendicular to the axis (or plane) of the sensor. Since such an arrangement causes the projected or sensed image to roll through 360 degrees for each revolution of the scanning element as it is rotated, such scanners normally incorporate a doubly reflecting mirror system or prism rotating at half the scanner rate to restore the image to the proper orientation. These systems provide a full 360 degree scan, but require an image derotator turning continuously at one half the scan rate. Since such systems require dynamic synchronization of two elements rotating at different rates while maintaining precise optical alignment through multiple reflections, they are expensive to produce, suffer from accuracy problems, and are heavy and difficult to balance. Consequently, they are seldom used for high speed scanning systems.

In the past, laser projectors have only had the capability to scan a single beam of light over a narrow angle while modulating it one pixel at a time to create a projected raster. There are many types of laser projectors that scan a single beam in a raster fashion, such as using a rotating polygon wheel for a fast axis, and a galvanometer for a slow axis. This type of projector is limited in image size vs. projection distance, and therefore creates a narrow image. These types of projectors sometimes use a magnifying lens to shorten the throw distance. This method is unsuitable for a panoramic display because it magnifies the pixels in both the horizontal and vertical directions. Additionally, bandwidth limitations have hindered the development of a high resolution panoramic display from a single projector modulating a single laser beam.

One method of scanning a linear array to form an image uses a grating light valve (GLV) to project a linear array over a narrow field of view on a flat screen. Unfortunately, mere use of a GLV does not address the problem of creating a panoramic display on a curved screen. Prior systems for wide angle image projection also include head-mounted laser projectors incorporating a line scanner. This type of system scans a 1-dimensional image over a relatively limited field of view. Since there is no offset, the scanner must be mounted at the viewing position (e.g. on a helmet).

SUMMARY OF THE INVENTION

It has been recognized that it would be advantageous to develop a direct view display system that can project a wide field of view from a single projection location that is more nearly optimized for a uniform display, and provides good color matching and no seams.

The invention advantageously provides a wide angle display system including a linear array projector, a curved display surface, and a substantially planar scanning mirror. The linear array projector is configured to project an image along an optical axis toward the scanning mirror. The scanning mirror is configured to continuously rotate about an axis substantially in the plane of the mirror, and to reflect the image onto the display surface.

In accordance with another more detailed aspect of the present invention, the scanning mirror includes two parallel, opposing reflective sides, and rotates at one half the refresh rate of the projector.

In accordance with yet another more detailed aspect of the present invention, the linear array projector is configured to project an image comprising a series of lines of pixels, and the rotational axis of the scanning mirror is parallel to the lines of pixels. The scanning mirror is configured to reflect the lines of pixels onto and scan the image across the curved display surface.

In accordance with another embodiment of the invention, the system can comprise multiple linear array projectors projecting images at the scanning mirror, so as to produce a composite panoramic image on the display surface.

In accordance with still another more detailed aspect of the present invention, the system can comprise a polygonal scanning mirror with a plurality of vertical reflective faces, configured to reflect images from a plurality of linear array projectors.

In one exemplary embodiment, the present invention features a wide angle display system comprising: (a) a single linear array projector, configured to project an image along an optical axis; (b) a curved display surface; and (c) a scanning mirror disposed along the optical axis and configured to continuously rotate about a rotational axis, the scanning mirror comprising n scanning surfaces configured to reflect the image onto the display surface within a scan field, wherein the scan field comprises a width determined by how far the scanning mirror is allowed to rotate before the projected image from the projector encounters an edge of the scanning surface. The scanning mirror is configured to rotate about its axis at a speed of 1/n the refresh rate of the projector.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention, as represented in FIGS. 1 through 20, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for providing a wide angle or panoramic projection, scanning, and viewing system. Generally, the inventors have developed a new type of laser scanner for surrounding a viewer with a panoramic image. For purposes of this discussion, the terms "panoramic image" and "panoramic display" are used to refer to a display or image in which the horizontal dimension is much greater than the vertical dimension. It will be apparent that "horizontal" and "vertical" are relative terms. They do not refer to any particular relationship to the earth's horizon, but refer to arbitrary orthogonal axes. The importance of the vertical relative to the horizontal will become more apparent from the discussion below.

For direct view display systems, it is desirable to project a wide field of view from a common location, which is more nearly optimized for a uniform display and provides good color uniformity, without seams. For a system like that shown in FIG. 13, the preferred projector location to meet these requirements would be somewhere near the center of the dome, but behind and above the viewing point 106. A similar system would be desirable for wide angle virtual systems, such as that shown in FIGS. 14 and 15, where the viewing point 120 is offset from the optical axis of a screen and mirror.

Figure 13:
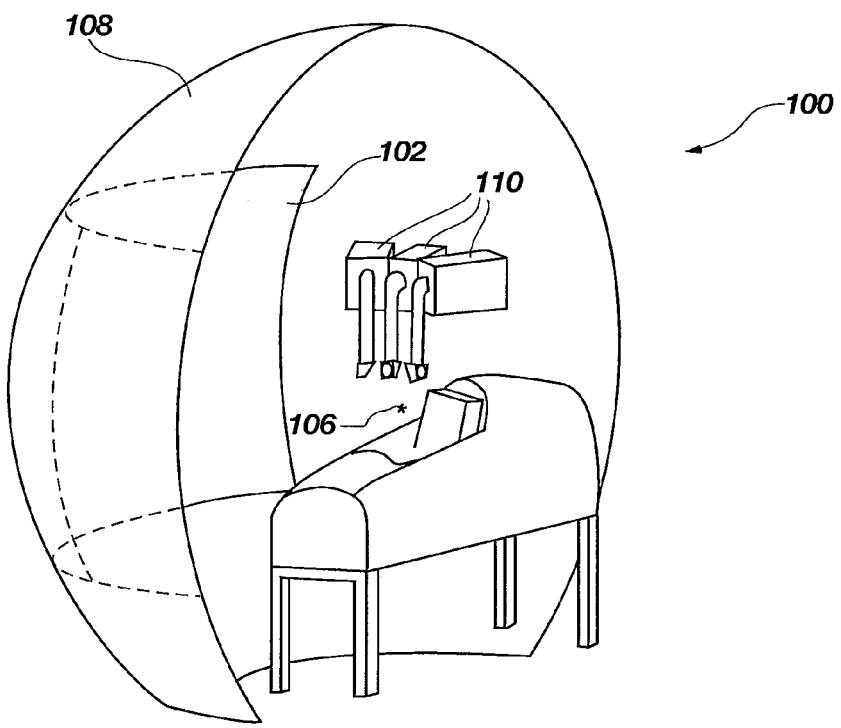
FIG. 13 is a pictorial view of a prior art flight simulator employing a real image display using multiple projectors for producing a panoramic image on the inside of a dome display surface.
Figure 14:
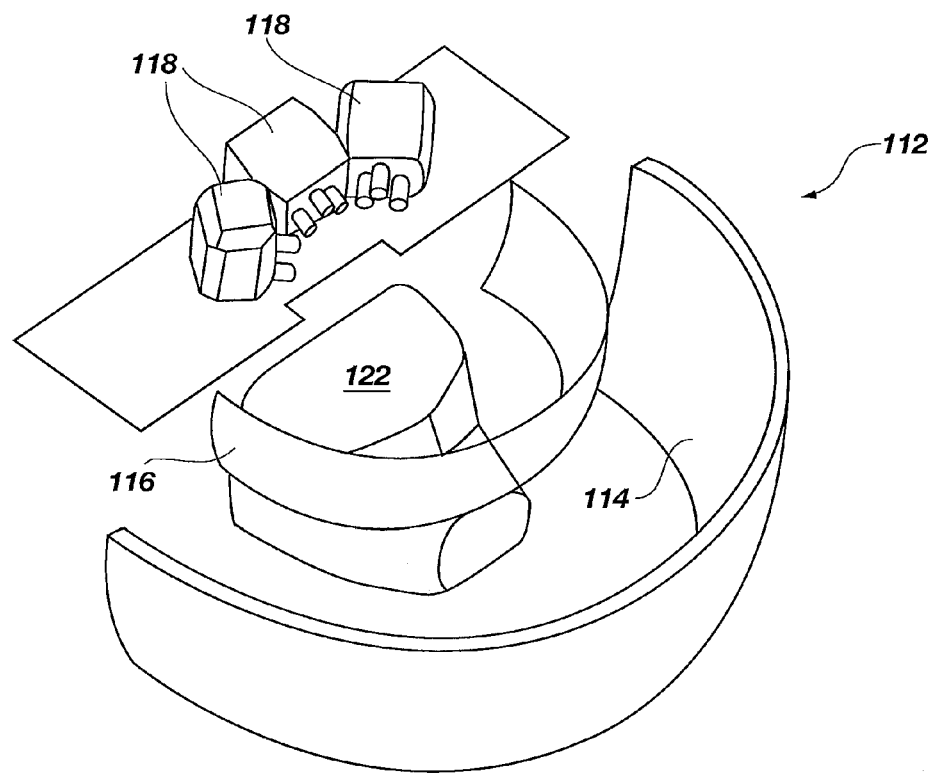
FIG. 14 is a pictorial view of a prior art flight simulator employing multiple projectors for producing a panoramic virtual image.
Figure 15:
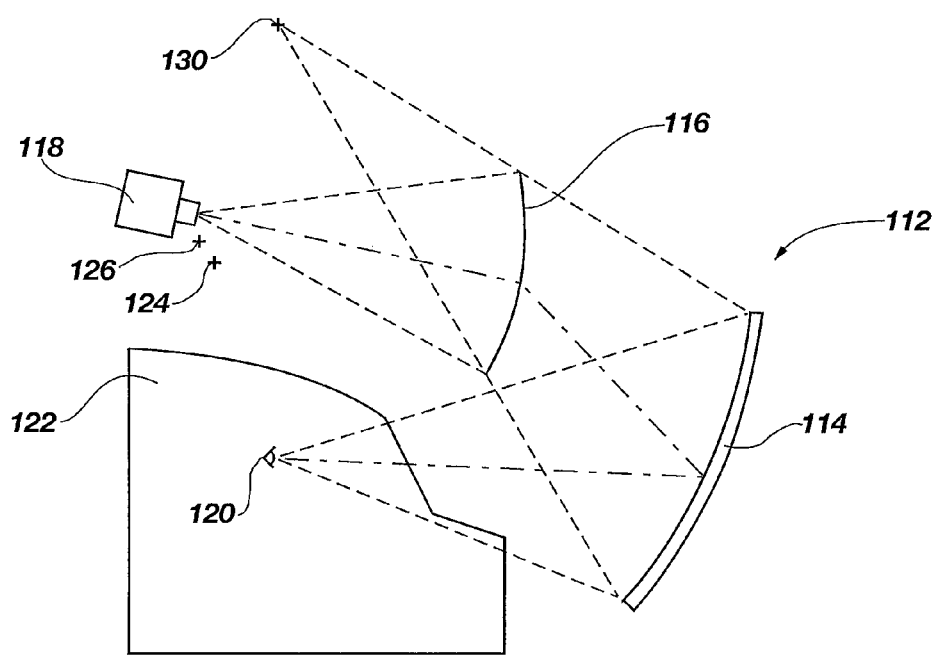
FIG. 15 is an elevational view of the flight simulator of FIG. 14.

The present invention addresses these issues by projecting a vertical column of pixels created by a linear array spatial light modulator as the image source. This column of pixels is scanned across a wide angle to create a panoramic field of view, with the scanner located above and behind the viewing point. This offset geometry creates problems for projectors in general and for panoramic displays using multiple projectors in particular. In general, projectors should be located close to the viewing point for best brightness and contrast. This becomes difficult when multiple projectors are used, as shown in FIGS. 13 and 14. The wide angle laser scanner of the present invention addresses these problems.

Figure 1:
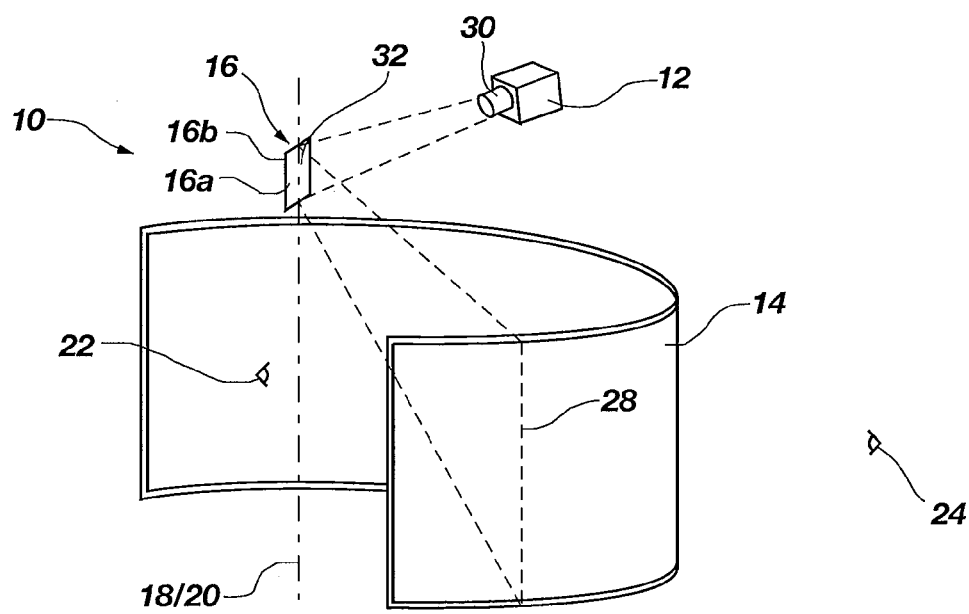
FIG. 1 is a perspective view of one embodiment of a wide angle scanner in accordance with the present invention.
Figure 2:
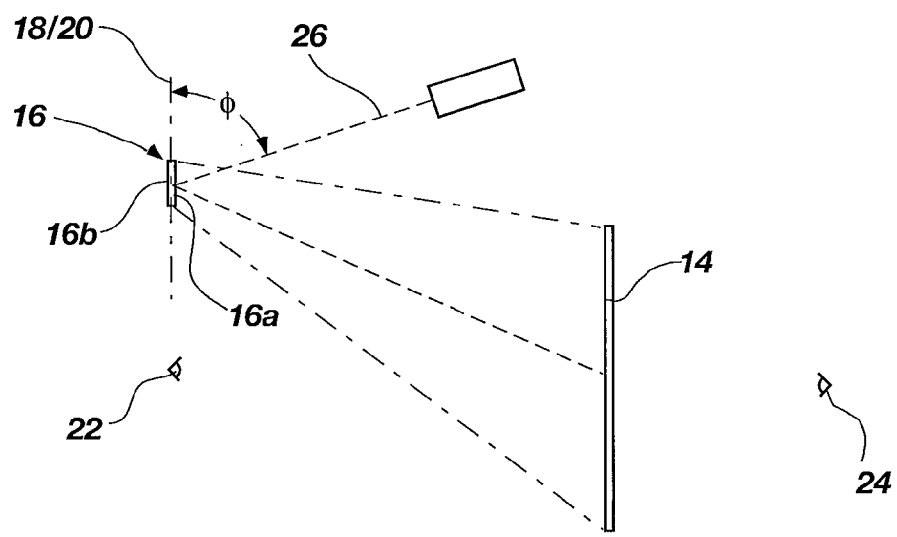
FIG. 2 is an elevational view of the wide angle scanner of FIG. 1.

FIGS. 1 and 2 show one embodiment of a panoramic real image display system 10 which the inventors have built in accordance with the present invention. This system comprises a linear array projector 12 (i.e. GLV projector), a curved display screen 14, and a flat (i.e. substantially planar) scanning mirror 16 having a rotational axis 18 in the plane of the mirror. The curved display screen has an axis or center of curvature 20. The rotational axis is parallel to and preferably collinear with the axis of curvature.

Figure 3:
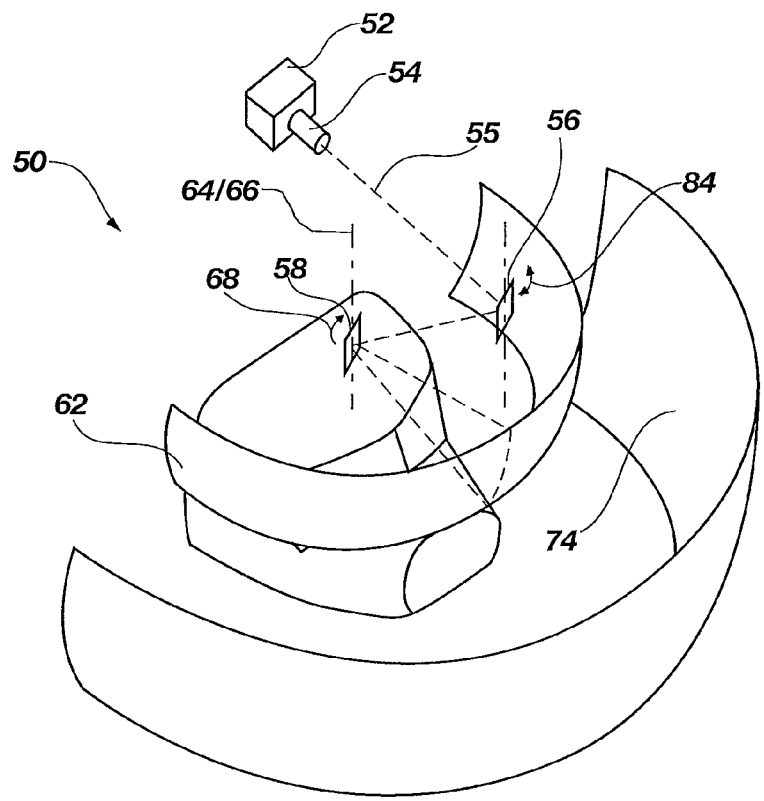
FIG. 3 is a perspective view of a wide angle virtual display flight simulator incorporating an alternative embodiment of wide angle scanner in accordance with the present invention.
Figure 4:
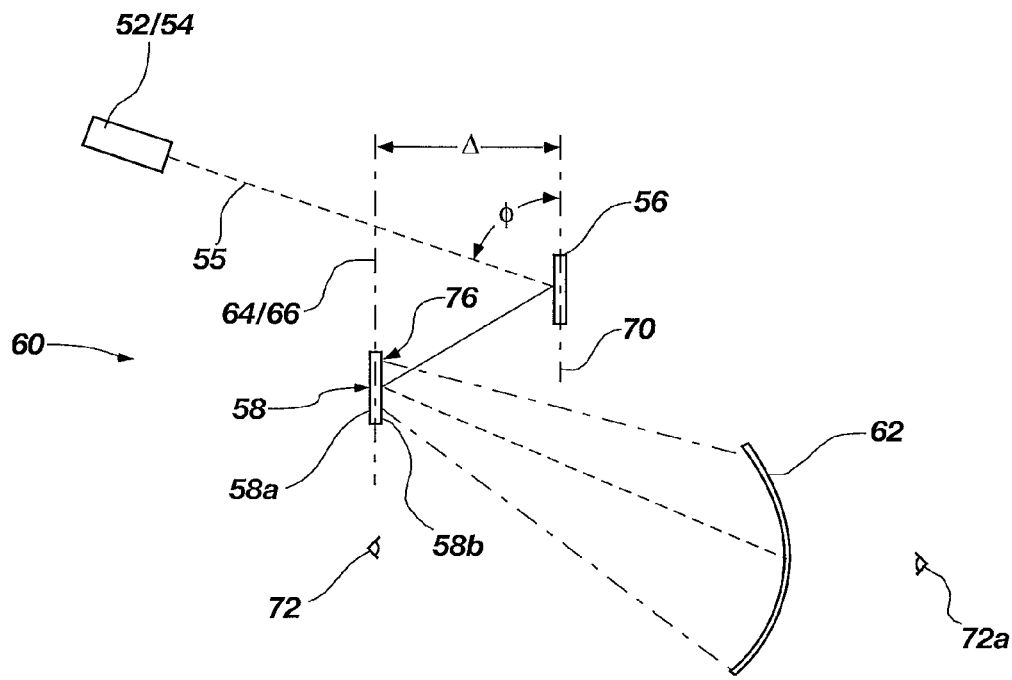
FIG. 4 is an elevational view of a wide angle real image display incorporating a wide angle scanner similar to that of FIG. 3.

The primary viewer location or eyepoint 22 is located below the scanning mirror 16 and approximately on the rotational axis/axis of curvature 18/20, viewing the concave side of the screen 14. However, the display screen could be a back projection screen, thus creating a secondary viewer location 24 viewing the convex side of the curved screen. While the screen shown in FIGS. 1 and 2 is curved about a single axis (i.e. the screen forming a portion of a cylinder), this embodiment of the invention could also be used with a double curved screen (i.e. the screen forming a portion of a sphere), as is depicted in FIGS. 3 and 4.

The linear array projector 12 projects an image along an optical axis 26 toward the scanning mirror 16, which reflects the image onto the screen 14. The optical axis is oblique to the rotational axis 18 of the scanning mirror. In order to scan a projected field that wraps around the eyepoint 22, the direction of projection must be at an oblique angle to the axis of rotation of the scanner. This is necessary in order for the light from the scanning mirror not to reflect back onto the projector as it scans through a continuous field of view. Otherwise, the body of the projector itself would cast a shadow on a portion of the screen. This also allows the scanner to be located at a position other than at the eyepoint of the panoramic real image display.

Advantageously, the invention does this without a separate derotating element. Instead, it scans a linear array over a panoramic field of view without a second derotating element turning at a different velocity from the scan. The projector is configured to produce the image by continuously scanning a vertical (rather than horizontal) line of pixels 28. The designation of "vertical" is relative to the orientation of the rotational axis 18 of the scanning mirror, which corresponds to the vertical dimension of the panoramic image, discussed above. The projected line of pixels is parallel to the rotational axis of the scanning mirror.

The scanning mirror 16 is configured to continuously rotate about its rotational axis 18 to reflect the image onto the screen 14. The image produced by the GLV projector 12 is continuously scanned at a refresh rate, such as 60 Hz. During each refresh cycle, the planar scanning mirror rotates through one half of a rotation, reflecting each scanned vertical line 28 of the image onto the screen at its proper location to reproduce the total image. The angular swing of the mirror causes the image to be projected across a very wide arc, resulting in a wide panoramic image. In one embodiment, the scanning mirror has two reflective sides, 16a, 16b, and rotates at a rate that is half the refresh rate (i.e. 30 Hz). This is possible because each side of the mirror scans the image across the screen during one refresh cycle of the projector, and then faces away during the next cycle.

The projector 12 has a projection lens 30 with an external pupil 32 to project the image of the vertical column of pixels 28. It will be assumed for the purpose of this discussion that the real image at this point consists of the vertical column of pixels that can be modulated as the scanner rotates to form a two-dimensional image on the screen 14. The scanning mirror 16 is preferably located at the position of the external pupil 32. This is done so that the image produced on the scanning mirror will be as small as possible, thus allowing use of a smaller mirror. The projection lens is oriented to produce an angle φ between the optical axis 26 and the axis of rotation 18 of the scanning mirror. The angle φ is chosen to achieve the proper offset of the projection point (i.e. location of the projector lens) versus the viewing point 22 for a real image display system. An angle of φ=55 degrees has been used in this system, though other angles could also be used.

The scanning mirror 16 is the main scanning mechanism, driven continuously by a servomotor (not shown) which is phase-locked to the image update rate of the projector 12, typically 60 Hz. In one example, approximately 110 degrees of the continuous 360 degree rotation of the scanning mirror assembly is used for each side of the mirror assembly to create two continuous 220 degree scans relative to the eyepoint 22 on the viewing screen 14 for each rotation of the mirror. This requires a 30 Hz (1800 RPM) rotation rate of the scanning mirror.

Figure 7:
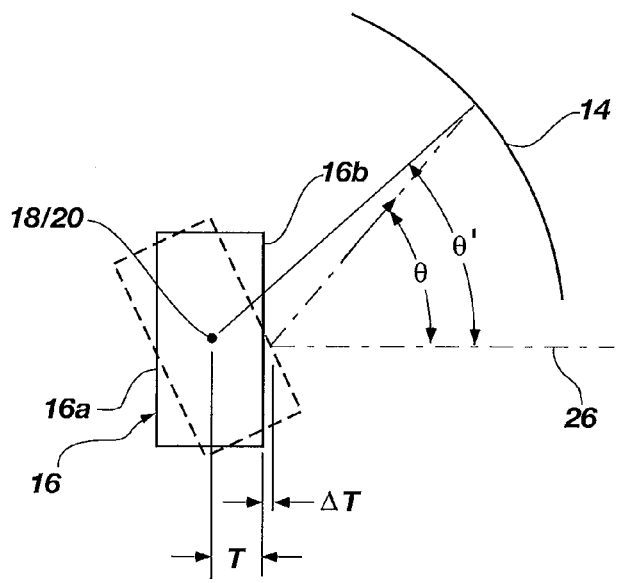
FIG. 7 is a top exaggerated view of a planar scanning mirror and curved screen, showing some effects of the mirror thickness relative to the position of projection on the display screen.
Figure 8:
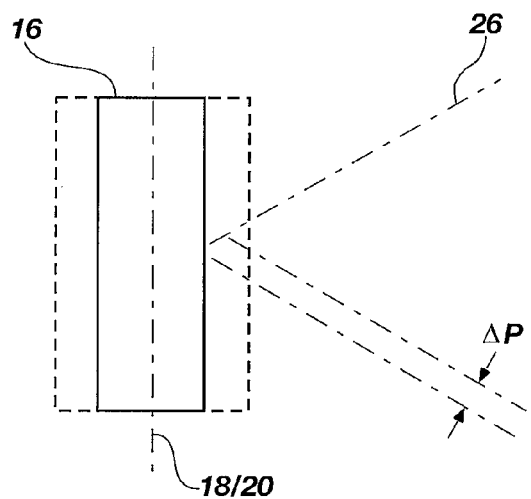
FIG. 8 is an exaggerated side view of a planar scanning mirror, showing some effects of the mirror thickness relative to apparent pixel size.
Figure 9:
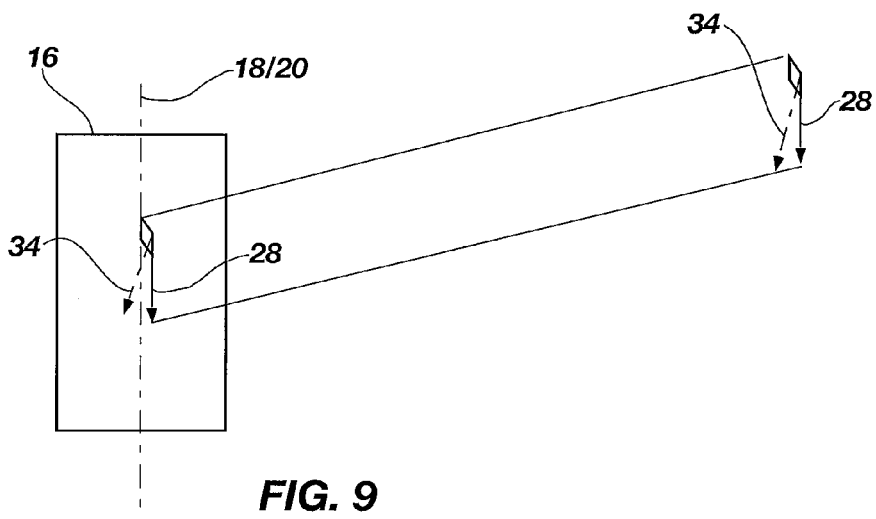
FIG. 9 is a diagram showing the effects of deviation of the pixel line from the vertical.

The rotating scanning mirror 16 presents certain technical considerations because of its rotation and because of its geometry. Some of these are illustrated in FIGS. 7-9. One consideration is the rotational motion of the mirror. As shown in FIG. 9, the oblique incidence of the projected image (line of pixels) 28 on the rotating mirror would normally cause the projected image to rotate, indicated by the dashed line 34. However, since the image formed by the GLV is essentially a vertical column of pixels of zero thickness, no image rotation occurs as long as the line of pixels is parallel to the axis of rotation 18 of the scanning mirror, and there is no component of the line image which is perpendicular to the axis of rotation of the scanning mirror.

Another consideration is the thickness of the mirror. As noted, the scanning mirror assembly 16 utilizes a two sided mirror. Since the mirror cannot have zero thickness, each scanning mirror surface has a small offset T (equal to half the total thickness of the mirror) from the axis of rotation 18, as shown in FIGS. 7 and 8. This offset causes the image to be slightly deflected both in the horizontal and in the vertical direction as the scanning mirror rotates. As shown in FIG. 7, if each mirror surface 16a, 16b of the scanning mirror is offset a distance T from the axis of rotation, the image source will intercept the mirror a distance ΔT closer as the mirror rotates from the normal position. As seen from the side view of FIG. 8, this will cause the image to be displaced in distance ΔP upwards on the screen to the left and right of the horizontal center of the screen. The inventors have calculated the magnitude of ΔP for various conditions, and have found that it is well within the error budget for both collimated and direct view display applications.

The mirror offset from the axis of rotation also causes a horizontal displacement of the image with rotation. As shown in FIG. 7, the image source intercepts the mirror surface 16a, 16b at a distance T from the axis of rotation and as the mirror rotates this distance is increased by ΔT. The inventors have found that the angular error E is less than 0.7 degrees for a mirror of 0.5" thickness and a screen having a 48" radius. This level of error is considered acceptable for most applications. Both horizontal and vertical errors can be set to zero in the forward field of view, and increasing to the values indicated at +/90 degrees of azimuth. If greater geometric accuracy is required, it can be obtained by performing Non-Linear Image Mapping (NLIM) in the image generator.

The oblique angle of incidence onto the projection screen also causes a top to bottom defocus of the image. Those skilled in the art will recognize that this can be corrected by a scheimpflug tilt of the GLV. Geometric correction for the image keystone and projection onto a spherical screen can also be performed by NLIM in the image generator.

Figure 5:
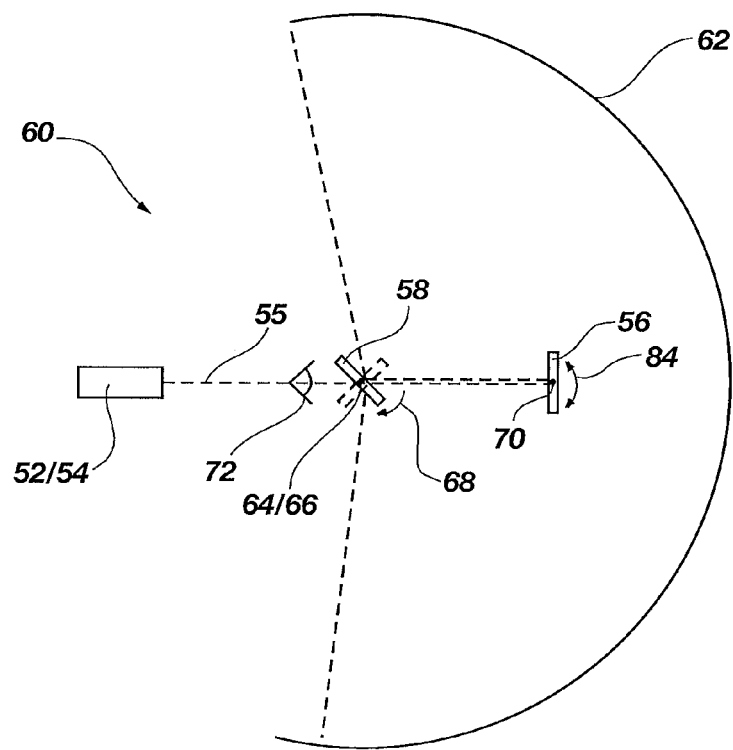
FIG. 5 is a top view of the wide angle scanner of FIG. 4.

Additional embodiments of wide angle displays in accordance with the invention are depicted in FIGS. 3-5. A wide angle virtual display 50 (similar to the configuration of FIG. 14) is shown in FIG. 3. A wide angle real image display 60 using the same type of projection system is depicted in FIG. 4, with FIG. 5 providing a plan view of this system. This embodiment of the projection system provides a panoramic display employing two mirrors, rather than just one. In this embodiment; the GLV projector 52 and projection lens 54 are essentially the same as in the embodiment of FIG. 1. The projector directs an image along an optical axis 55 toward a flat folding mirror 56. The folding mirror 56 reflects the image to the scanning mirror 58, which reflects the image to the curved projection screen 62. As with the embodiment of FIGS. 1 and 2, the projection lens 54 of the projector has an external pupil 76, and the scanning mirror 58 is preferably placed at the position of the external pupil so that the size of the projected rays on the mirror will be as small as possible. An external pupil is preferred, but lenses with an internal pupil can also be used, and simply require a larger mirror.

The scanning mirror 58 is located with its rotational axis 64 parallel to and preferably collinear with a vertical axis 66 (i.e. axis of curvature) of the curved projection screen 62. It will be apparent that a double-curved surface, such as the screen shown in FIG. 3, has an infinite number of axes of curvature. However, there is one preferred axis of curvature that is the axis of horizontal curvature with respect to the orientation of the panoramic image. In other words, an axis that is parallel to the vertical dimension of the image and represents the center of horizontal curvature of the screen is the desired axis of curvature.

The scanning mirror has two parallel reflective sides 58a, 58b, that are opposite each other and symmetrical about the axis of rotation. The scanning mirror rotates continuously in the direction of arrow 68 to scan a regularly updated image onto the screen. The rotational axis of the scanning mirror is parallel to and located a distance Δ from the vertical axis 70 of the folding mirror. The distance Δ and the height of both mirrors are chosen to ensure that all projected rays are accepted by the scanning mirror and clear the folding mirror upon reflection from the scanning mirror. The resulting image can either be viewed directly from a primary viewpoint 72 below the scanning mirror, or a secondary viewpoint 72a outside the curvature of the screen (when using a back-projection screen). Alternatively, as depicted in FIG. 4, the image can be viewed via a reflection from a large collimating mirror 74 placed forward of a rear projection screen, as shown in FIG. 3, and following the geometry shown in FIG. 15. The embodiment of FIG. 3 essentially replaces the multiple projectors 110 of FIGS. 14 and 15 with a single projector and scanning mirror at or near the same location or a better location, so as to provide the same panoramic image.

As with the embodiment of FIG. 1, the optical axis 55 is at a downward tilt angle φ, this angle being selected so as to place the projector at a better location for either the real image display or the collimated wide angle virtual display. The optical axis is oblique to the axis of the scanning mirror so that the scanner can be located at a position other than at the eyepoint or primary viewer location 72 of the panoramic real image display of FIG. 4, and to allow the main lobe of light from a back projection screen to be directed largely toward the eyepoint in the virtual display of FIG. 3. In the embodiments depicted in FIGS. 3-5, the display screens 62 are depicted as being doubly-curved. However, the display system of these embodiments could also be used with a singly-curved display surface, as in the embodiment of FIG. 1. Likewise, the screens could be front- or back-projections screens in the real image displays of FIGS. 1, 2, 4, and 5.

Figure 6A:
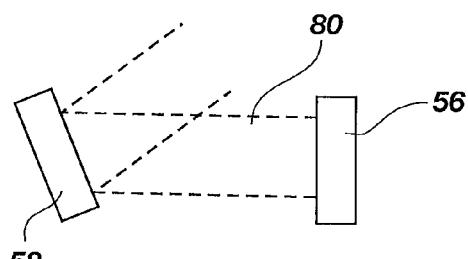
FIGS. 6a-6d are top views of a planar scanning mirror and folding mirror, showing the relative effects of articulation of the folding mirror.
Figure 6C:
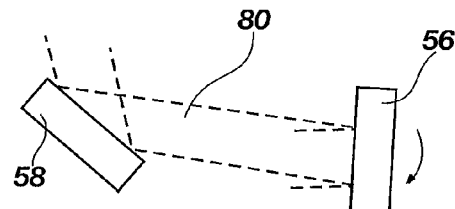
Figure 6B:
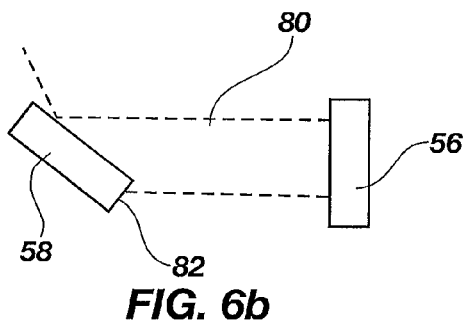

The folding mirror 56 is normally fixed, but can be articulated or oscillated about its vertical axis 70 for a wider field of view, as illustrated in FIGS. 6a-6d. It is understood that a single mirror doubles the incident angle of light upon reflection. When two mirrors are articulated in series, an additional scanning increment is achieved, which may be required for some very wide field-of-view applications. Viewing the top-down views of the folding mirror 56 and scanning mirror 58 in FIGS. 6a-6d, the light bundle 80 reflected off of the mirrors converges to a line on the screen 62, but has significant cross section at the mirrors. For small projection angles, all of the light can be collected and reflected by the scanning mirror, as shown in FIG. 6a. For larger angles, the edge 82 of the scanning mirror will begin to block some of the light as shown in FIG. 6b. However, if the folding mirror is rotated slightly relative to the scanning mirror, as shown in FIG. 6c, then all of the light can be directed toward the screen for a wider projection angle.

Figure 6D:
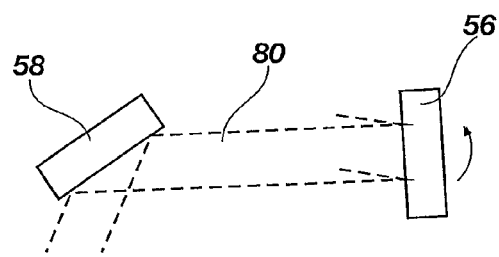

As the scanning mirror 58 rotates through a single scan cycle (i.e. one half rotation), the folding mirror 56 rotates slightly in the opposite direction, following the motion of the scanning mirror. This allows the entire light bundle 80 of the image to strike the mirror at the extreme beginning of the cycle, as shown in FIG. 6c, and at the extreme end of the cycle, as shown in FIG. 6d. When the scanning mirror reaches the end of a single scan cycle, the folding mirror must rapidly revert back to its position at the beginning of the scan cycle, and repeat the process. This arrangement requires the folding mirror to rapidly oscillate between the positions shown in FIGS. 6c and 6d at a rate that is twice the rotational frequency of the scanning mirror. This oscillation is indicated by the two headed arrow 84 in FIGS. 3 and 5. It will be apparent that the rotational axis 70 of the folding mirror is parallel to the rotational axis 64 of the scanning mirror, so that no rotation of the image is produced by the oscillation of the folding mirror. This configuration advantageously allows the system to produce a wider field of projection. The inventors have found that with this configuration a panoramic image 270° wide can be produced using a single projector.

Figure 10:
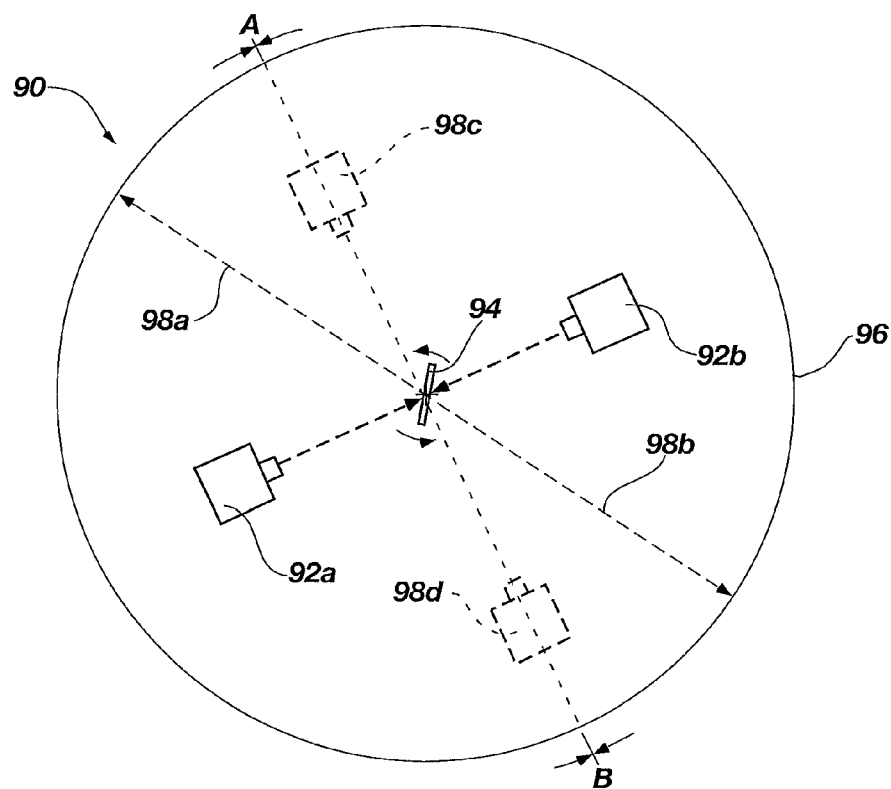
FIG. 10 is a plan view of a panoramic scanner system incorporating two projectors and a planar scanning mirror to produce a 360° image.

Advantageously, the wide angle display system of the present invention can be configured with multiple projectors, which can allow a full 360° scan, and/or accommodate projectors or systems with various limitations. For example, as shown in FIG. 10, a multiple projector system 90 can be provided with two projectors 92 oriented on opposite sides of a single two-sided planar scanning mirror 94. As the mirror rotates, the vertical line of pixels from each projector is scanned across one half of the full circle screen 96 to give a fully-surrounding panoramic image. One projector 92a will project an image 98a across a first half of the screen, from point A to point B, while the other projector scans an image 98b across a second half of the screen from point B to point A. As with the prior systems described above, this system can be used with single- or double-curved, front- or rear-projection screens.

The configuration of FIG. 10 is not limited to two projectors, but can be used with any number of projectors. For example, additional projectors 98c, 98d, can be located so as to further subdivide the portion of the image provided by a single projector. The incorporation of additional projectors can be desirable to increase the resolution of the total image. For example, where each projector provides a maximum pixel density in the horizontal dimension, the pixel density of the total composite image can be increased by using multiple projectors. This technique can be used even if a full-surround image is not desired. For example, with the embodiment of FIG. 1, two projectors could be aimed at the same scanning mirror, each projector offset some angular distance from the other, and each providing half of the panoramic image, though not creating a composite image that fully surrounds the viewpoint.

Multiple projectors can also be used to overcome bandwidth limitations in the image generator (IG). If one IG channel only has the capacity to scan a relatively narrow or lower resolution image at the desired refresh rate, multiple IG channels can be used to provide the desired high-resolution image as a composite of images from several projectors.

Figure 11:
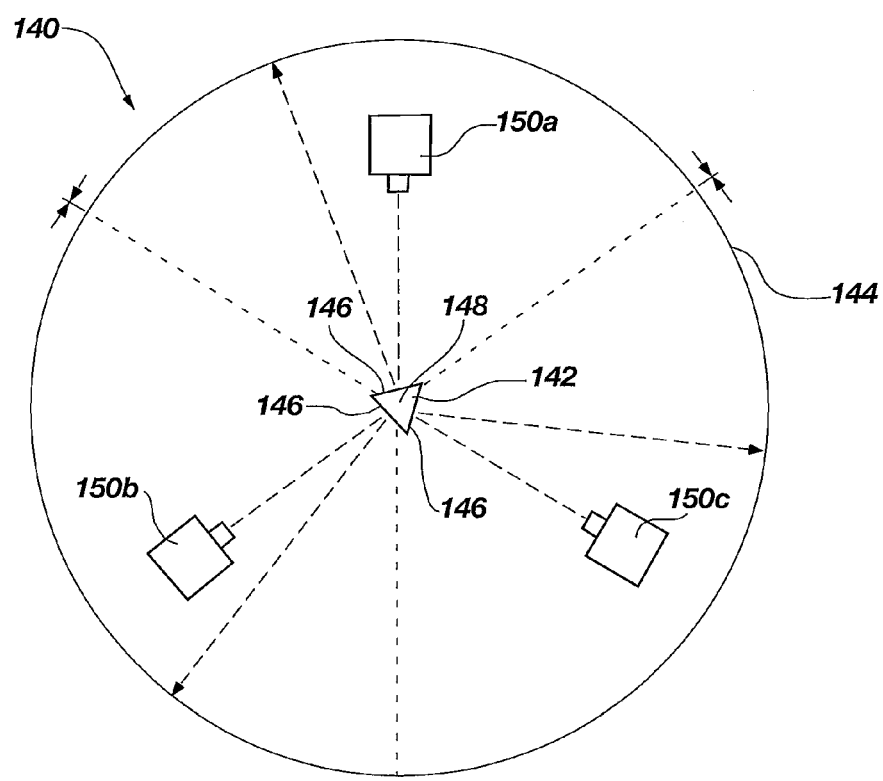
FIG. 11 is a plan view of a panoramic scanner system incorporating three projectors and a polygonal scanning mirror to produce a panoramic display.

Another embodiment of a panoramic projection system 140 employing multiple projectors is shown in FIG. 11. This configuration uses a polygonal scanning mirror 142 to scan the image across the circular screen 144. As shown, the scanning mirror is a triangular shape, having three vertical reflective sides 146. Other shapes can also be used. As the mirror rotates about its vertical axis 148 through a full circle, it sequentially reflects the image from each projector 150a-150c onto a portion of the screen.

Figure 12:
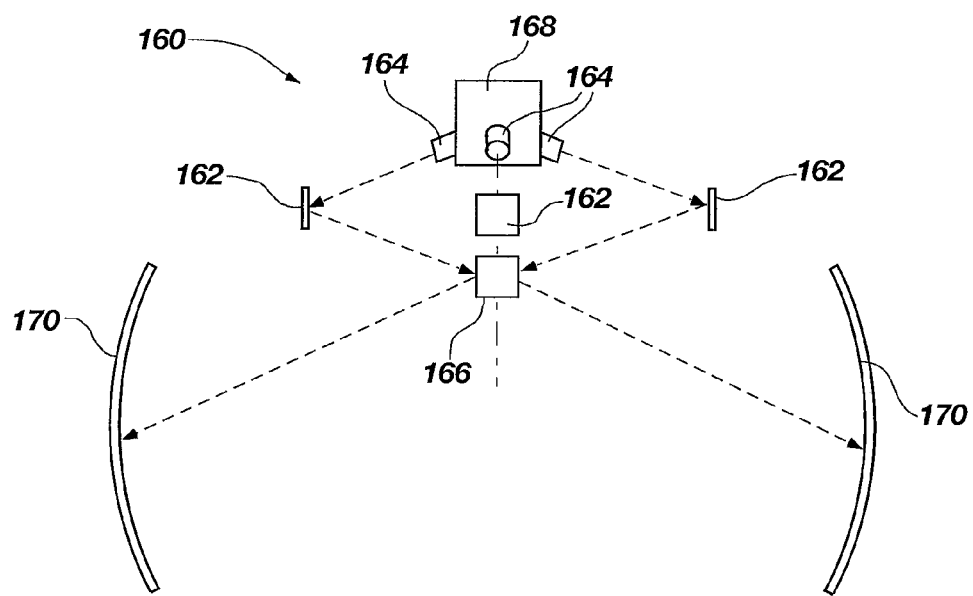
FIG. 12 is an elevational view of a panoramic scanner system incorporating multiple projectors in a single unit, with a folding mirror for each projector, and a single polygonal scanning mirror.

The embodiments of FIGS. 10 and 11 each comprise multiple projectors and a single scanning mirror. However, the advantages of a folding mirror can also be incorporated into a multiple projector system. Referring to FIG. 12, a multi-projector panoramic display system 160 includes a plurality of folding mirrors 162 that are oriented to reflect images from multiple projectors 164 to a single scanning mirror 166. In the example shown, the scanning mirror is a four-sided polygon, and the multiple projectors are disposed in a single housing 168 located directly above the scanning mirror. This configuration allows the relatively bulky projectors to be located in a less conspicuous location, yet still scan the image onto the panoramic screen 170.

Figure 16:
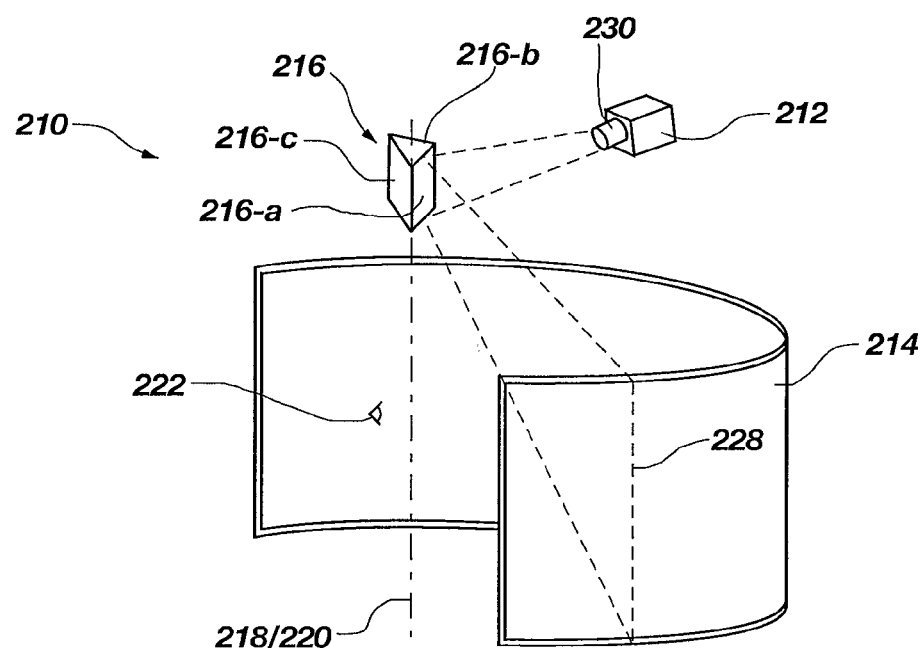
FIG. 16 is a perspective view of another embodiment of a wide angle scanner in accordance with the present invention, wherein a single projector is utilized with a polygonal scanning mirror.
Figure 17:
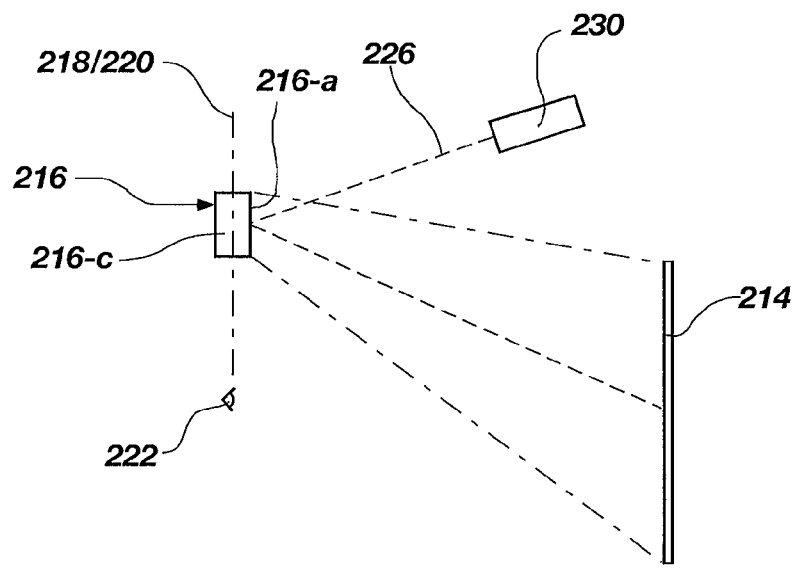
FIG. 17 is an elevational view of the wide angle scanner of FIG. 16.
Figure 18:
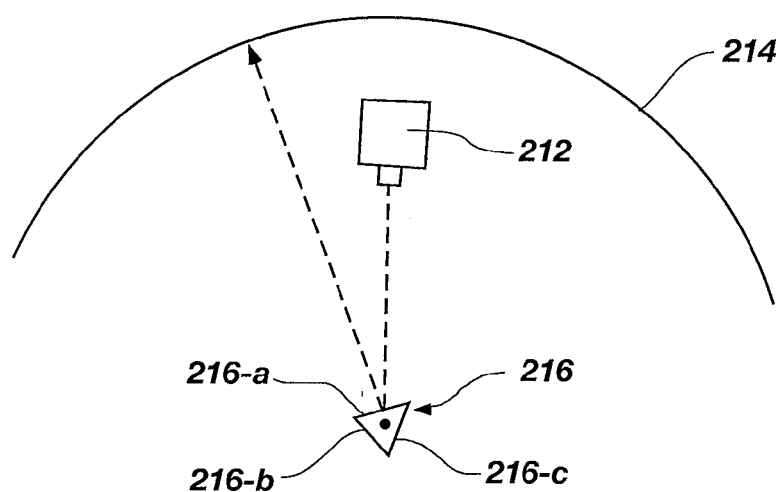
FIG. 18 is a top view of the wide angle scanner of FIG. 16.

With reference to FIGS. 16-18, the present invention further features a wide angle or panoramic scanning and image display system, wherein an n-sided scanning mirror is utilized with a single projector to project an image onto a display surface of a display screen. Specifically, FIGS. 16 and 17 show an alternative embodiment of a wide angle or panoramic real image display system 210 comprising a single projector, such as the linear array projector 212 shown (e.g., GLV projector), a curved display screen 214, and a polygonal scanning mirror 216, having three scanning or reflective surfaces or sides and a rotational axis 218. The curved display screen 214 has an axis of curvature 220 that is parallel to and preferably collinear or coaxial with the rotational axis 218.

The primary viewer location or eye point 222 is located below the scanning mirror 216 and approximately on the rotational axis/axis of curvature 218/220, viewing the concave side of the screen 214. However, the display screen 214 could be a back projection screen, thus creating a secondary viewer location viewing the convex side of the curved screen, as taught above. While the display screen 214 shown in FIGS. 16 and 17 is curved about a single axis (i.e. the screen forming a portion of a cylinder), this embodiment of the invention could also be used with a double curved screen (i.e. the screen forming a portion of a sphere), as is depicted in FIGS. 3 and 4.

The linear array projector 212 projects an image along an optical axis 226 toward the scanning mirror 216, which reflects the image onto the screen 214. The optical axis is oblique to the rotational axis 218 of the scanning mirror. In order to scan a projected field that wraps around the eye point 222, the direction of projection must be at an oblique angle to the rotational axis 218 of the scanning mirror 216. This is necessary in order for the light from the scanning mirror 216 not to reflect back onto the projector 212 as it scans through a continuous field of view. Otherwise, the body of the projector itself would cast a shadow on a portion of the display screen 214. This also allows the scanning mirror 216 to be located at a position other than at the eye point 222 of the panoramic real image display. The projector 212 is configured to produce the image, while the scanning mirror 216 is configured to scan a vertical (rather than horizontal) linear array or line of pixels over a panoramic filed of view (the scan field), which linear array of pixels is shown as pixels 228. The projected line of pixels 228 is parallel to the rotational axis 218 of the scanning mirror 216.

The scanning mirror 216 is configured to continuously rotate about its rotational axis 218 to reflect the image onto the screen 214. The image produced by the GLV projector 212 is continuously scanned at a refresh rate, such as 60 Hz. During each refresh cycle, the scanning mirror 216 rotates through a rotation to reflect each scanned vertical line 228 of the image onto the display screen 214 at its proper location to reproduce the total image. The angular swing of the scanning mirror 216 causes the image to be projected across a very wide arc, resulting in a wide panoramic image. The scanning mirror 216 is the main scanning mechanism, driven continuously by a servomotor (not shown) which is phase-locked to the image update rate of the projector 212, typically 60 Hz.

In this particular embodiment, the scanning mirror 216 comprises a polygonal scanning mirror having three scanning or reflective surfaces, shown as reflective surfaces 216-a, 216-b, and 216-c. As such, the scanning mirror 216 is configured to rotate at a speed or rate that is ⅓ (one-third) the refresh rate of the scanned image (i.e. 20 Hz). This is possible because each side of the scanning mirror 216 scans the image across the display screen 214 during one refresh cycle of the projector 212, and is then passive during the next two cycles. In other related embodiments in which a single projector is used, the scanning mirror 216 may comprise a single scanning surface, or a plurality of scanning surfaces. As such, it is contemplated that the scanning mirror 216 may comprise n sides or n scanning surfaces. The rotational speed or rate of the scanning mirror 216 is, therefore, 1/n the refresh rate with a single projector.

As can be seen, unlike the embodiments discussed above, this particular embodiment utilizes a single projector 212 to provide an image to a polygonal scanning mirror 216, rather than a multiple projector arrangement. The single projector 212 has a projection lens 230 with an external pupil to project the image of the vertical column of pixels 228. It will be assumed for the purpose of this discussion that the real image at this point consists of the vertical column of pixels that can be modulated as the scanning mirror 216 rotates to form a two-dimensional image on the display screen 214. The scanning mirror 216 is preferably located at the position of the external pupil, as taught above. The projection lens 230 is preferably oriented to produce an angle between the optical axis 226 and the rotational axis 218 of the scanning mirror 216, also as taught above.

FIG. 18 illustrates a top view of the system described above and shown in FIGS. 16 and 17. As can be seen, the scanning mirror 216 comprises a three-sided polygonal scanning mirror, with scanning or reflective surfaces 216-a, 216-b, and 216-c configured to reflect the projected image onto the display screen 214 upon rotation in accordance with the image scan refresh rate.

Figure 19:
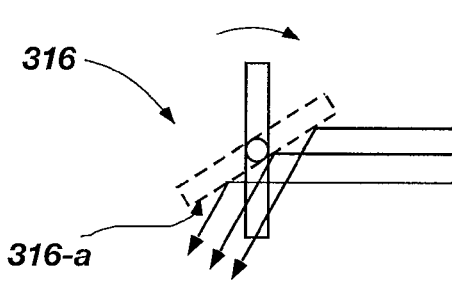
FIG. 19 is a partial top view illustrating a one-sided scanning mirror to be used with a single projector.
Figure 20:
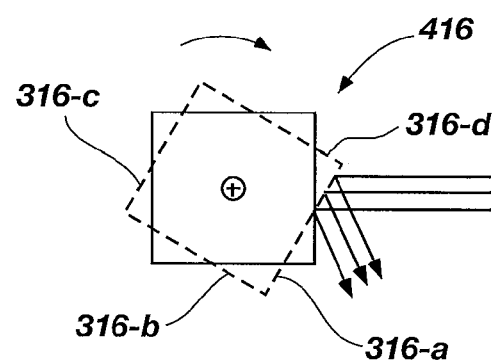
FIG. 20 is a partial top view illustrating a four-sided scanning mirror to be used with a single projector.

The present invention contemplates other polygonal scanning mirrors capable of being incorporated into the present invention. FIG. 19 illustrates an exemplary polygonal scanning mirror 316 comprising a single reflective surface 316-a. FIG. 20 illustrates an exemplary polygonal scanning mirror 416 comprising four reflective surfaces, shown as reflective surfaces 416-a, 416-b, 416-c, and 416-d. FIGS. 19 and 20, along with FIGS. 16-18, illustrate how the scanning mirror may comprise any number of reflective surfaces, as needed or required. In essence, a high number of scanning surfaces may be used, or as little as one. Essentially, the limit of how wide a field can be scanned in a particular configuration is determined by how far the scanning mirror can rotate before the projected incident light from the projector encounters an edge of the scanning surface. For a reflective surface having a particular width, the resulting width of the scan field is determined by how far away the scan surface is located from the rotational axis of the scanning mirror. Ideally, a two-sided scanner would have zero thickness. However, for practical applications, the thickness must be finite to allow for mechanical stress, optical flatness, and other factors. The thickness of the two-sided scanning mirror reduces its efficiency because the time during which the sides are rotating through the beam the scanning mirror is passive and not reflecting the image, or in other words is not useable, thereby reducing the duty cycle and increasing the bandwidth required for the displayed information to be scanned out. This efficiency can be improved, at the expense of maximum scan angle, by increasing the number of reflective surfaces of the scanning mirror. It is easily demonstrated that if the beam were zero width and the facets or reflective surfaces of the scanning mirror met with a zero width edge, the optimum number of facets or reflective surfaces for a particular application would be equal to 360 degrees divided by twice the required scan field. If a 180° scan were required, for example, the optimum number of reflective surfaces would be 4. However, since real beams have a finite thickness and the edges of the reflective surfaces cannot be fabricated to comprise a zero thickness, a practical 180° scanning mirror would have three reflective surfaces, while a practical scanning mirror for fields of view beyond 240° would have two reflective surfaces. The other practical consideration is that increasing the number of reflective surfaces causes an increase in the distance of each surface from the rotational axis, as well as an increase in the distortion of the scanned image and variation in optical path, both undesirable effects.

In addition, the exemplary systems discussed above and shown in FIGS. 16-20 may further comprise or incorporate a folding mirror, as taught herein.

In sum, the invention provides the advantages of wide angle scanning from an offset projector position. The system advantageously allows projection of an image across a circular arc of more than 180 degrees using a single projection source. As noted above, the various embodiments of the panoramic scanner can be used for both real image and virtual projection systems, using either a front or back projection screen that is either singly or doubly curved. The invention can be used for wide angle virtual displays for both civil and military training, and for direct view panoramic displays for deployable military trainers. It may also have application for command/control type displays, or displays for remote control of unmanned air or ground vehicles. The invention may be adapted for helmet-mounted displays as well. Many other uses are also possible. For example, real-image rear-projection panoramic displays can be used for advertising or informational kiosks at trade shows, in a shopping mall, an airport, or a museum. A composite real-time image of the earth from weather satellites could be projected onto the inside of a spherical back projection screen, and viewed from outside to provide a complete perspective of global weather and geography.

Advantageously, with the present invention, horizontal magnification is achieved by mechanical rotation of a very simple and aberration-free optical element (a flat mirror), without the need for an exotic and expensive anamorphic projection lens. The invention also scans over a large field of view, while being mounted away from the viewer location, unlike some head-mounted laser projectors. Also, unlike some other panoramic scanning systems, the present system does not require a second rotating element to act as a derotator.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are expressly recited. Accordingly, the scope of the invention should be determined solely by the appended claims and their legal equivalents, rather than by the descriptions and examples given above.

What is claimed and desired to be secured by Letters Patent is:

1. A wide angle display system comprising:
    a single linear array projector, configured to project an image along an optical axis;
    a curved display surface having a center of curvature;
    a scanning mirror disposed along the optical axis and configured to continuously rotate about a rotational axis, wherein the rotational axis is parallel to and collinear with the center of curvature of the curved display; and
    the scanning mirror comprising n scanning surfaces configured to reflect the image onto the display surface within a scan field, wherein the scan field comprises a width determined by how far the scanning mirror is allowed to rotate before the projected image from the projector encounters an edge of the scanning surface.

2. The wide angle display system of claim 1, wherein each of the n scanning surfaces comprise a pre-determined width, such that the width of the scan field is determined by how far away the n scanning surfaces are located from the rotational axis of the scanning mirror.

3. The wide angle display system of claim 1, wherein the projector comprises a refresh rate, and wherein the scanning mirror is configured to rotate at a speed that is 1/n the refresh rate.

4. The wide angle display system of claim 1, wherein the scanning mirror comprises a single scanning surface.

5. The wide angle display system of claim 1, wherein the scanning mirror comprises a polygonal configuration having a plurality of scanning surfaces.

6. The wide angle display system of claim 1, wherein the linear array projector is configured to project an array of pixels that is substantially parallel to the rotational axis.

7. The wide angle display system of claim 1, wherein the optical axis is oblique to the rotational axis of the scanning mirror.

8. The wide angle display system of claim 1, further comprising a folding mirror disposed along the optical axis and having an axis substantially parallel to the rotational axis of the scanning mirror, the folding mirror being configured to reflect the image to the scanning mirror.

9. The wide angle display system of claim 8, wherein the folding mirror is configured to oscillate about its said axis, so as to increase a field of projection of the image.

10. The wide angle display system of claim 1, wherein the display surface comprises an axis of curvature that is substantially parallel to the rotational axis of the scanning mirror.

11. The wide angle display system of claim 10, wherein the axis of curvature of the display surface is substantially collinear with the rotational axis of the scanning mirror.

12. A method for projecting a panoramic image comprising:
    continuously rotating a scanning mirror having n scanning surfaces about a rotational axis that is substantially parallel to and collinear with a center of curvature of a curved display screen;
    projecting an image onto the scanning surfaces of the scanning mirror using a grating light valve projector, the image comprising lines of pixels substantially parallel to the rotational axis, so as to reflect the image onto the curved display screen; and
    rotating the scanning mirror at a speed 1/n the refresh rate to cause the image to be scanned within a scan field on the display screen.

* * * * *